(12) United States Patent
Meiri et al.

(10) Patent No.: US 10,459,883 B1
(45) Date of Patent: Oct. 29, 2019

(54) RETENTION POLICIES FOR UNSCHEDULED REPLICAS IN BACKUP, SNAPSHOTS, AND REMOTE REPLICATION

(71) Applicant: EMC IP Holding Company LLC, Hopkinton, MA (US)

(72) Inventors: David Meiri, Cambridge, MA (US); Xiangping Chen, Sherborn, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 604 days.

(21) Appl. No.: 14/984,324

(22) Filed: Dec. 30, 2015

(51) Int. Cl.
  *G06F 16/11* (2019.01)
(52) U.S. Cl.
  CPC ........ *G06F 16/128* (2019.01); *G06F 2201/84* (2013.01)
(58) Field of Classification Search
  CPC ........... H04L 29/0854; G06F 17/30578; G06F 17/30067
  USPC ......... 707/613, 204, 692, 769, 651; 709/226
  See application file for complete search history.

(56) References Cited

U.S. PATENT DOCUMENTS

| | | | |
|---|---|---|---|
| 5,960,176 A * | 9/1999 | Kuroki | H04L 41/0206 709/223 |
| 6,901,399 B1 | 5/2005 | Corston et al. | |
| 7,827,146 B1 * | 11/2010 | De Landstheer | G06F 11/1451 707/651 |
| 7,870,172 B1 * | 1/2011 | Sarma | G06F 17/30185 707/822 |
| 8,452,741 B1 * | 5/2013 | Kuhr | G06F 17/30085 707/662 |
| 9,002,805 B1 * | 4/2015 | Barber | G06F 17/30303 707/692 |
| 9,462,056 B1 | 10/2016 | Protopopov et al. | |
| 9,645,891 B2 * | 5/2017 | Ahn | G06F 11/1461 |
| 9,659,077 B2 * | 5/2017 | Chen | G06F 17/30581 |
| 9,766,927 B1 * | 9/2017 | Islam | G06F 9/4843 |
| 9,912,752 B1 * | 3/2018 | Davis | H04L 67/1097 |
| 9,984,139 B1 * | 5/2018 | Ye | G06F 17/30575 |
| 2005/0066239 A1 | 3/2005 | Keeton et al. | |
| 2007/0143371 A1 | 6/2007 | Kottomtharayil | |
| 2007/0174246 A1 * | 7/2007 | Sigurdsson | G06F 17/30176 |
| 2009/0313503 A1 | 12/2009 | Atluri et al. | |
| 2011/0029520 A1 | 2/2011 | Leary et al. | |
| 2011/0145217 A1 * | 6/2011 | Maunder | G06F 17/30094 707/709 |
| 2011/0282842 A1 * | 11/2011 | Popovski | G06F 11/1435 707/649 |
| 2012/0203742 A1 | 8/2012 | Goodman et al. | |

(Continued)

*Primary Examiner* — William Spieler
(74) *Attorney, Agent, or Firm* — Ryan, Mason & Lewis, LLP

(57) ABSTRACT

Example embodiments of the present invention relate to methods, systems, and computer program products for determining replicas for removal from a plurality of replicas. The method includes identifying a set of user conditions associated with time windows as defined in a data retention policy. The method further includes, for each user condition, determining a plurality of replicas satisfying the user condition having a time value in the associated time window and, if the plurality of replicas exceeds a maximum for the user condition as defined in the data retention policy, removing extraneous replicas from the plurality of replicas so the plurality of replicas does not exceed the maximum for the user condition.

21 Claims, 13 Drawing Sheets

(56) References Cited

U.S. PATENT DOCUMENTS

| | | | |
|---|---|---|---|
| 2012/0215779 A1 | 8/2012 | Lipstone | |
| 2013/0132346 A1* | 5/2013 | Varadarajan | G06F 11/1448 707/639 |
| 2013/0191601 A1 | 7/2013 | Peterson et al. | |
| 2015/0106331 A1* | 4/2015 | Certain | G06F 17/30088 707/637 |
| 2015/0227600 A1 | 8/2015 | Ramu et al. | |
| 2015/0278233 A1* | 10/2015 | Ng | G06F 17/30085 707/662 |
| 2015/0363270 A1* | 12/2015 | Hammer | G06F 11/1451 711/162 |
| 2016/0004882 A1 | 1/2016 | Ballai et al. | |
| 2016/0034481 A1* | 2/2016 | Kumarasamy | G06F 17/30088 707/639 |
| 2016/0092535 A1 | 3/2016 | Kuchibhotla et al. | |
| 2016/0142483 A1* | 5/2016 | Nallathambi | H04L 67/1097 707/639 |
| 2016/0147609 A1* | 5/2016 | Wallace | G06F 16/128 707/647 |
| 2016/0147830 A1* | 5/2016 | Zhong | G06F 17/30085 707/769 |
| 2016/0224660 A1* | 8/2016 | Munk | G06F 17/30619 |
| 2016/0321338 A1 | 11/2016 | Isherwood et al. | |
| 2017/0041296 A1* | 2/2017 | Ford | H04L 63/0421 |
| 2017/0177449 A1* | 6/2017 | Bronk | G06F 11/1464 |
| 2017/0371572 A1* | 12/2017 | Lee | G06F 3/061 |

\* cited by examiner

RETENTION POLICIES FOR UNSCHEDULED REPLICAS IN BACKUP, SNAPSHOTS, AND REMOTE REPLICATION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATION

This Application is related to U.S. patent application Ser. No. 14/984,334 entitled "CREATING REPLICAS AT USER-DEFINED POINTS IN TIME" filed on even date herewith the teachings of which application are hereby incorporated herein by reference in their entirety.

TECHNICAL FIELD

This application relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, at the hypervisor level or at the data block level.

SUMMARY

Example embodiments of the present invention relate to methods, systems, and computer program products for determining replicas for removal from a plurality of replicas. The method includes identifying a set of user conditions associated with time windows as defined in a data retention policy. The method further includes, for each user condition, determining a plurality of replicas satisfying the user condition having a time value in the associated time window and, if the plurality of replicas exceeds a maximum for the user condition as defined in the data retention policy, removing extraneous replicas from the plurality of replicas so the plurality of replicas does not exceed the maximum for the user condition.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
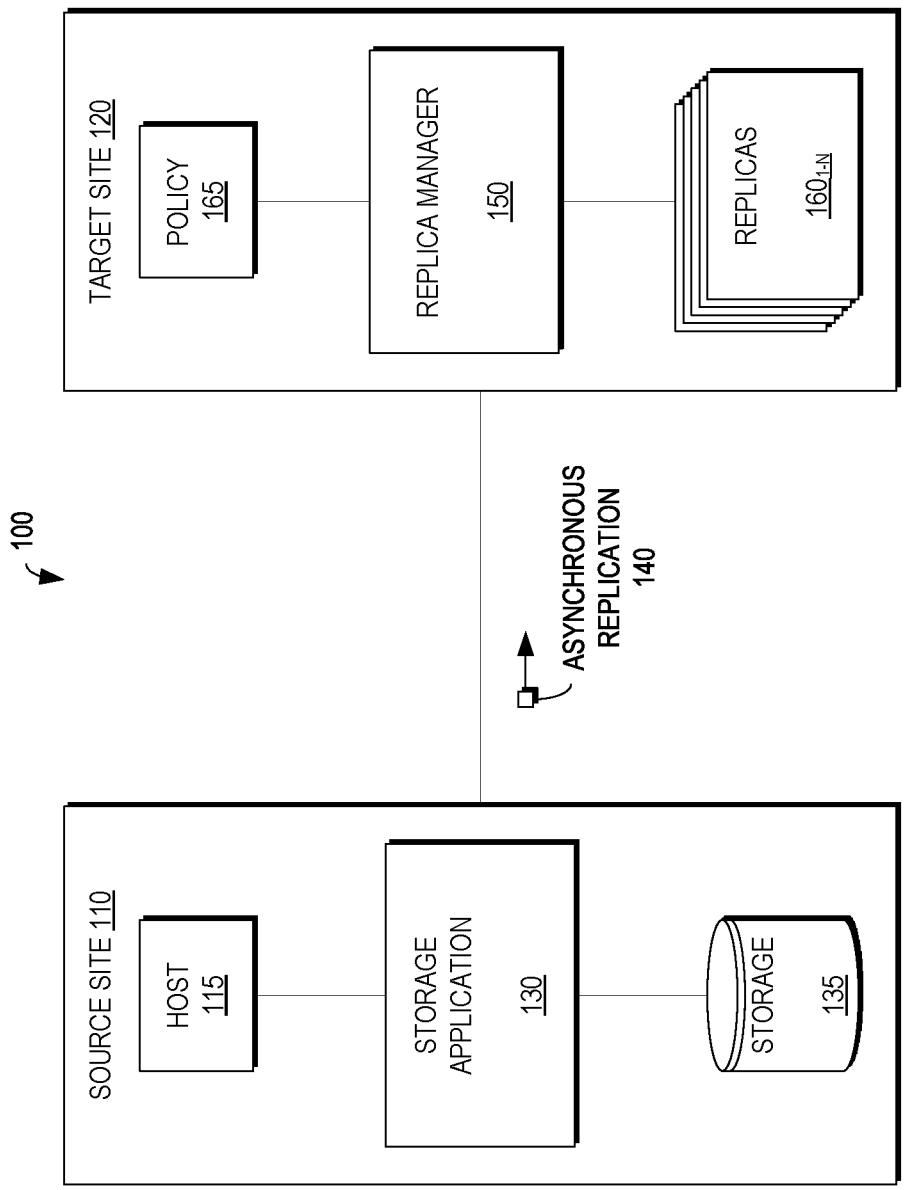
FIG. 1 is a block diagram illustrating a system according to an example embodiment of the present invention.

Traditionally, many distributed systems use a consistent snapshot mechanism to replicate data between a source site and a target site. Typically, replication using a consistent snapshot mechanism is limited by the speed at which a storage system is able to complete replication cycles. Improvements to conventional replication using a consistent snapshot mechanism would be beneficial to the data storage industry.

Typically, a consistent snapshot is created from data within a storage system from one or more sources at the beginning of a replication cycle. Generally, once the data changes, those changes are transferred to a target site. Conventionally, upon completion of the data transfer, a snapshot is created at the target site which contains the same data as the snapshot(s) resident at the source site(s), thereby completing a replication cycle. Traditionally, each source site cannot send a subsequent snapshot until the completion of a replication cycle.

Conventionally, in asynchronous replication, there may be a lag between when, for example, a storage application at a source site sends a snapshot via asynchronous replication to a target site and when the source site receives an acknowledgement of the processing of that snapshot at the target site. In some embodiments, the lag time or latency may be expressed any number of ways such as no more than a given period of time, a set amount of data (i.e., number of blocks), or a number of data transactions. A period of time may vary or may be a predetermined period of time selected though user configuration.

In further embodiments, in asynchronous replication, there may be a chance of data loss that may occur as the acknowledgement of receipt of a snapshot has been logged before the snapshot is actually written to storage at the target site. If there is a crash between the acknowledgement and when the snapshot is written, this data may be lost. In alternative embodiments, asynchronous replication may offer the ability to run the production site with little or no slowing due to data protection requirements. This may be because replication requirements, in terms of data needed to be replicated, may not be constant and may fluctuate. Asynchronous data replication may offer a buffer or lag which may buffer data replication, allowing it to build up during heavy replication periods and allowing it to catch up during lighter replication periods.

Traditional asynchronous replication products, such as Symmetrix Remote Data Facility (SRDF®) Asynchronous mode (SRDF/A) by EMC Corporation of Hopkinton, Mass., use replication cycles to minimize lag, where each cycle starts immediately when the previous cycle finished. When this traditional asynchronous replication is combined with maintaining the resulting consistent points-in-time (PITs) on the target site, a user can enjoy a history of past PIT replicas. However, because the creation of new cycles is unpredictable (i.e., it depends on the completion of the previous cycle) in traditional asynchronous replication, the timing of these replicas is also unpredictable.

Conventionally, data replication policies may describe different types of recovery, such as disaster recovery, operational recovery, and logical corruption recovery, and have a plurality of policy attributes, such as frequency of snapshots taken at the source site and how long each snapshot is kept at the target site, remote replica lag (e.g. the length of time during which updates may be lost in case of a source site failure), recovery point objective (RPO) (i.e., the maximum acceptable lag time between the time data is committed to the source site and the time it is committed to the target site or an acceptable amount of data loss measured in time), recovery time objective (RTO) (i.e., the time taken to perform the recovery), number of copies, automated storage tiering, and location. The policy attributes also may include the number of copies, the type of replication (i.e., SRDF or EMC RecoverPoint®, both by EMC Corporation of Hopkinton, Massachusetts), the mode of replication (i.e., synchronous, asynchronous, continuous data protection (CDP), point in time (PIT)), source engine type, and target engine type (i.e., Symmetrix® or VNX®, both by EMC Corporation of Hopkinton, Mass.).

Moreover, in typical data protection environments, there are competing objectives that may require tradeoffs in policy compliance. For example, RPO competes with application latency and a protection window (i.e., how far back in time is data protected) competes with snapshot granularity (i.e., how often data is backed-up) which, in turn, competes with target site processing storage size (i.e., the amount of storage needed for storing new data received while accessing an image on the target side). For example, in certain embodiments, the source site may slow down its response time which will result in less new data coming from users, thus reducing RPO as less data accumulates.

Traditional data protection environments are deficient in that they: (1) maintain only the last consistent copy (i.e., do not support preserving multiple PIT copies from different times); (2) maintain all copies (this will result in running out of space, or require a user to constantly monitor and remove redundant copies); (3) maintain last N copies, where N is a user-defined number (this method results in an unpredictable protection window, and possibly redundant copies (e.g., a copy from 24 hours ago and 24.01 hours ago)); and (4) use a retention policy that dilutes PIT copies based on a user's requirements (this will approximate the desired result but will not guarantee it (i.e., if a user wants a PIT every minute but cycles are 30 minute long, it is impossible to respect the user's policy)).

Example embodiments of the present invention recognize that it is desirable to respect a user policy that requires a certain schedule for PIT replicas (e.g., 5 in the last 10 minutes and 24 in the last 24 hours) while continuing to minimize the lag between the source and the target. Further, according to example embodiments of the present invention, it is possible to select which copies to retain automatically based on the time they were created, or the amount of data they protect, or the amount of changes they contain. Accordingly, with enough resources (e.g., storage space), example embodiments of the present invention are able to respect the exact policy requirements of the user with no compromise.

The words PIT, snapshot, and replica may be used interchangeably throughout.

FIG. 1 is a block diagram illustrating a system 100 according to an example embodiment of the present invention. As illustrated in FIG. 1, the system 100 includes a source site 110 and a target site 120. The source site 110 includes a host 115, a storage application 130, and storage 135. The target site 120 includes a replica manager 150 which may manage a plurality of replicas $160_{1-N}$ (160 generally) according to a policy 165. The host 115 may perform input/output (I/O) operations on the storage 135, which may be intercepted by the storage application 130. As changes are made to the storage 135 via the I/O operations from the host 115, the storage application 130 may perform asynchronous replication 140 from the source site 110 to the target site 120. As will be described in greater detail below, in example embodiments of the present invention, the timing of the asynchronous replication cycles and the retention of the replicas may be managed by the replica manager 150 at the target site 120.

Figure 2:
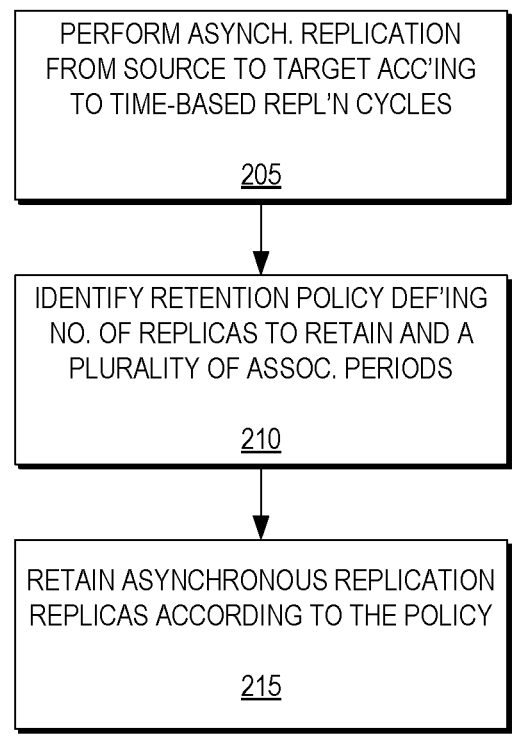
FIG. 2 is a flow diagram illustrating a method for performing asynchronous replication from a source to a target according to time-based replication cycles according to an example embodiment of the present invention.

FIG. 2 is a flow diagram illustrating a method for performing asynchronous replication from a source site to a target site according to time-based replication cycles according to an example embodiment of the present invention. FIG. 2 may be described in conjunction with FIG. 1. As illustrated in FIG. 2 asynchronous replication may be performed from a source site 110 to a target site 120 according to time-based replication cycles (205). A retention policy 165 may be identified defining a number of asynchronous replication replicas to retain and a plurality of associated periods (i.e., retention windows) (210). As described above, the retention policy 165 also may include other policy attributes, such as frequency of snapshots taken at the source site and how long each snapshot is kept at the target site, remote replica lag, RPO, RTO, automated storage tiering, and location. Asynchronous replication replicas 160 then may be retained according to the policy 165 (215).

In certain embodiments, the plurality of periods may be a sequence of periods such that each successive period in the plurality of periods is a multiple of an immediately preceding period in the plurality of periods. For example, for a plurality of periods, $L_0$, $L_1$, $L_2$, $L_3$, etc. (in seconds.), L0 divides evenly into L1, L1 divides evenly into L2, etc. The set of requirements $L=(L_0, L_1, L_2, L_3, \ldots)$ may be interpreted as follows:

$L_0$ is the minimal lag. Example embodiments of the present invention will attempt to switch asynchronous replication cycles at least (but not more often than) every $L_0$ seconds (in other words, $L_0$ is derived from the RPO or maximal amount of allowed data loss when recovering from the latest PIT).

$L_1$ is the first retention period (a PIT is created every $L_1$ seconds and is saved during the $L_2$ period); $L_2$ is the second retention period (a PIT is created every $L_2$ seconds and is saved during the $L_3$ period); Etc.

For example, the set of numbers $L_0=5$, $L_1=60$, $L_2=3600$, $L_3=86400$ provides a minimal lag of 5 seconds, where the target site 120 has a PIT replica 160 every minute for the last hour, and every hour for the last day, as will be described in greater detail below. In a preferred embodiment, each window excludes all replicas 160 from previous retention windows. In certain embodiments, the policy 165 may define a limit on a number of PIT copies to retain for each retention period (which may be arbitrary, including 0). For example, a policy 165 may specify "5 in the last 12 minutes", "2 in the last hour", and "24 in the last 24 hours". In some embodiments, the windows are ordered by size (e.g., from small to large). In some embodiments, the retention windows are defined between "now" and a previous point in time in the past.

Figure 3:
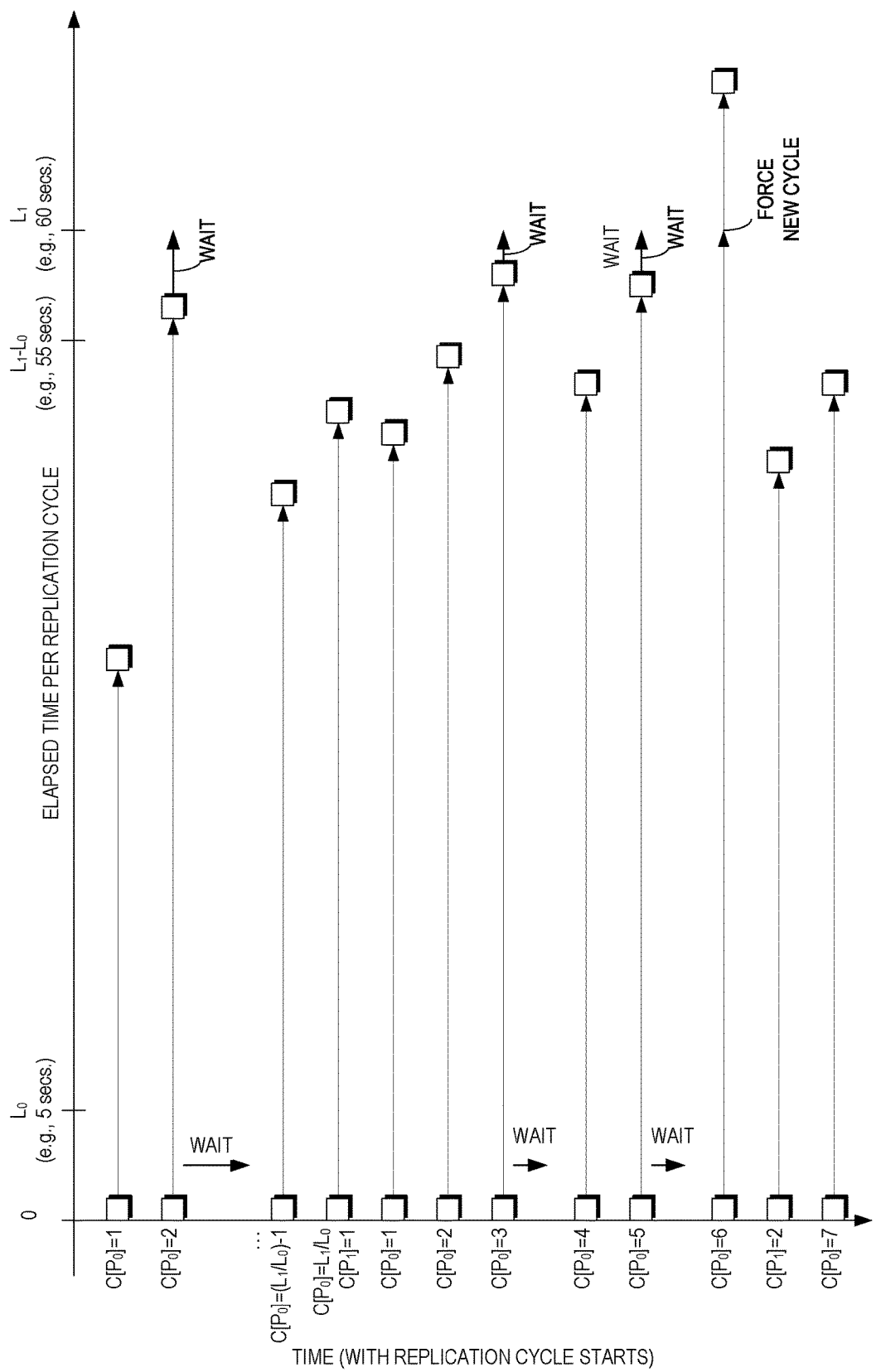
FIG. 3 is a state diagram illustrating time with replication cycle starts and elapsed time per replication cycle according to an example embodiment of the present invention.

FIG. 3 is a state diagram illustrating time with replication cycle starts and elapsed time per replication cycle according to an example embodiment of the present invention. As illustrated in FIG. 3, the X axis shows the elapsed time per asynchronous replication cycle, with each replication cycle starting at, for example, 0 seconds relative to itself (but with the cycle time of each previous cycle being the absolute replication cycle start time) and the Y axis shows time with replication cycle starts. In other words, in general, the start of asynchronous replication cycle $C[P_0]=2$ occurs following the completion of the asynchronous replication cycle $C[P_0]=1$ immediately preceding it (with the exception of asynchronous replication cycle $C[P_1]=2$ as will be described in greater detail below), particularly with reference to FIG. 4.

Figure 4:
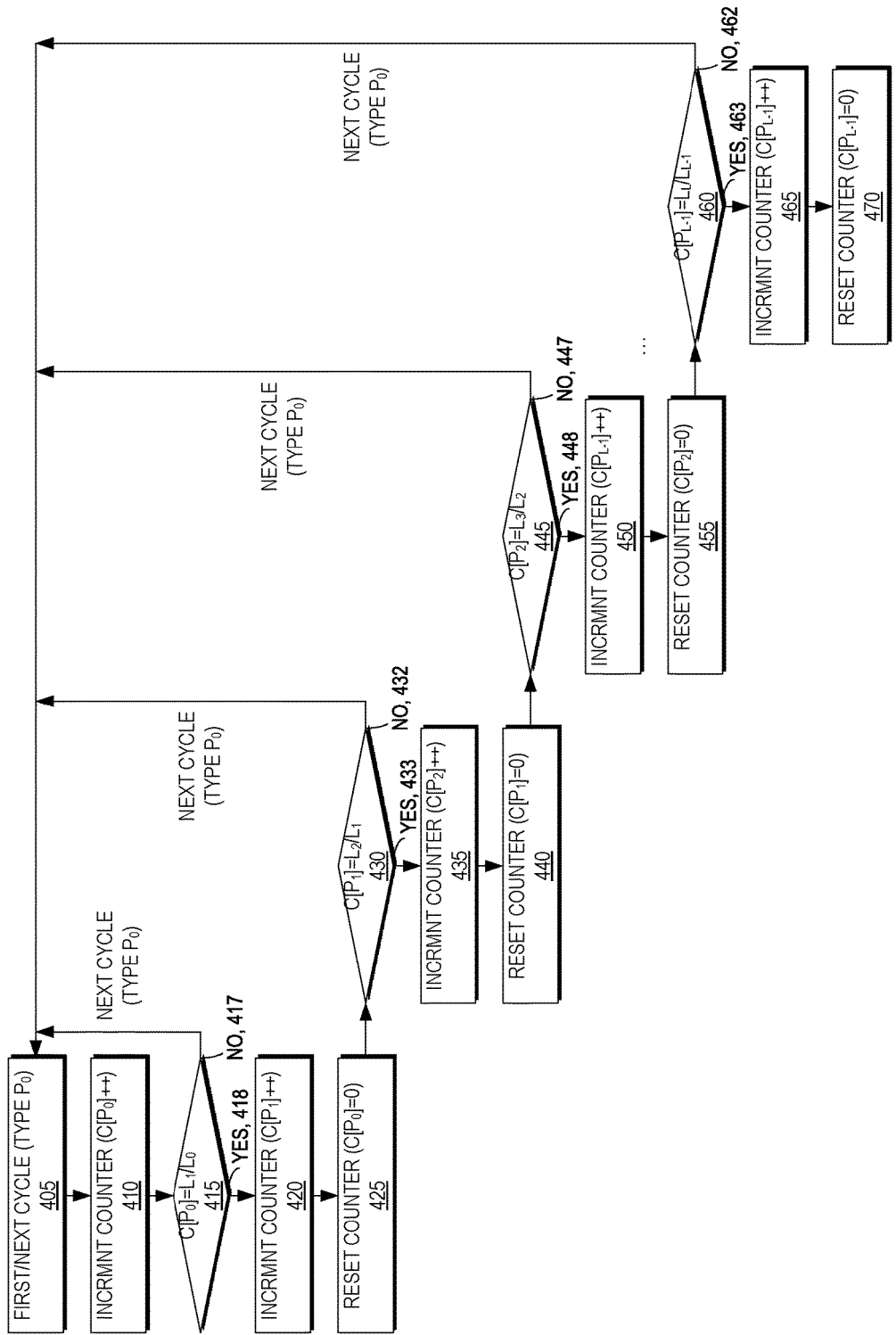
FIG. 4 is a flow diagram illustrating a method for performing asynchronous replication from a source to a target according to a plurality of retention periods and replication cycle levels according to an example embodiment of the present invention.

FIG. 4 is a flow diagram illustrating a method for performing asynchronous replication from a source 110 to a target 120 according to a plurality of retention periods and replication cycle levels according to an example embodiment of the present invention. FIG. 4 may be described in conjunction with FIGS. 1 and 3. As illustrated in FIG. 4, the asynchronous replication policy is defined to have a minimal lag of $L_0$ and, therefore, asynchronous replication cycle switches are attempted at least as often as every $L_0$ seconds. If the asynchronous replication system 100 has sufficient resources it should be able to attain this replication goal and asynchronously replicate a new snapshot every $L_0$ (i.e., 5) seconds. In this case, link bandwidth is sufficient for transmitting host writes, when peak writes may be smoothed over the $L_0$ period (in other words, the amount of writes in any window of $L_0$ seconds is not more than the transfer capacity of the links over $L_0$ seconds). In this case, we are guaranteed that cycle switching can occur exactly every $L_0$ seconds.

As illustrated in FIGS. 1, 3, and 4, a first asynchronous replication cycle may start (405). The cycle may be a first type (i.e., having a first retention period) of $P_0$ and an associated counter for the first cycle type may be incremented (i.e., $C[P_0]$++) (410) to $C[P_0]=1$. The replica manager 150 then may determine whether the counter $C[P_0]$ is equal to (or a multiple of) the ratio of the second retention period (i.e., $L_1$) and the first retention period (i.e., $L_0$) (i.e., is $C[P_0]=L_1/L_0$?) (415). If $C[P_0]$ is not equal to (or a multiple of) the ratio of the second retention period (i.e., $L_1$) and the first retention period (i.e., $L_0$) (i.e., $C[P_0] \neq L_1/L_0$) (417) then the next replication cycle may be performed (405) which will trigger an increment of the counter for the first cycle type of $P_0$ (i.e., $C[P_0]$++) (410) to $C[P_0]=2$. The replica manager 150 will continue to determine that the counter $C[P_0]$ is not equal to (or a multiple of) the ratio of the second retention period (i.e., $L_1$) and the first retention period (i.e., $L_0$) (i.e., $C[P_0] \neq L_1/L_0$) (417) through $C[P_0]=(L_1/L_0)-1$ (here, cycle 11 of type $P_0$ as $L_0=5$ and $L_1=60$)

For cycle 12 of type $P_0$ (i.e., $C[P_0]=L_1/L_0=12$ as $L_0=5$ and $L_1=60$), the replica manager will determine that $[P_0]$ is equal to (or a multiple of) the ratio of the second retention period (i.e., $L_1$) and the first retention period (i.e., $L_0$) (i.e., $C[P_0]=L_1/L_0$) (418) and will increment an associated counter for a second cycle type (i.e. $C[P_1]$++) (420) and mark the cycle $L_1/L_0$ as of the second type (i.e., $P_1$). The replica manager may then reset the counter for the first cycle type (i.e., $C[P_0]=0$) (425). Alternatively, the replica manager may skip this resetting step as the replica manager may determine whether the counter for the first cycle type is a multiple of the ratio of the second retention period (i.e., $L_1$) and the first retention period (i.e., $L_0$) (i.e., is $C[P_0]=L_1/L_0$?).

The replica manager then may determine whether the marking of cycle $L_1/L_0$ of the first type as a cycle of the second type caused the counter for the second cycle type to be equal to (or a multiple of) the ratio of the third retention period (i.e., $L_2$) and the second retention period (i.e., $L_1$) (i.e., is $C[P_1]=L_2/L_1$?) (430). Similar to the discussion above, if $C[P_1]$ is not equal to (or a multiple of) the ratio of the third retention period (i.e., $L_2$) and the second retention period (i.e., $L_1$) (i.e., $C[P_1 \neq L_2/L_1$) (432) then the next replication cycle may be performed (405) which will trigger an increment of the counter for the first cycle type of $P_0$ (i.e., $C[P_0]$++) (410) to $C[P_0]=1$. Asynchronous replication may continue to be performed, with $C[P_0]$ continuing to be incremented through groups of $L_1/L_0$ which, in turn, cause each $L_1/L_0$ cycle to be marked as the second type (i.e., $P_1$) and the associated counter for the second cycle type to be incremented (i.e. $C[P_1]$++) (420) until the counter for the second cycle type is equal to (or a multiple of) the ratio of the third retention period (i.e., $L_2$) and the second retention period (i.e., $L_1$) (i.e., $C[P_1]=L_2/L_1$) (433). As illustrated in FIG. 4, the above arrangement of incrementing counters and marking cycles continues through successive levels for each retention period $L_0-L_N$, e.g., as illustrated in steps (435), (440), (445), (447), (448), (450), (455), (460), (462), (463), (465) and (470) of FIG. 4

For example, for the set of retention period values $L_0=5$, $L_1=60$, $L_2=3600$, $L_3=86400$, every $12^{th}$ snapshot (i.e., $L_1/L_0=60/5=12$) will be marked as $P_1$ to be retained at the target side for 1 minute (i.e., $L_1=60$ seconds). Likewise, every $60^{th}$ snapshot marked $P_1$ (i.e., $L_2/L_1=3600/60=60$) will be marked as $P_2$ to be retained at the target side for 1 hour (i.e., $L_2=3600$ seconds). Similarly, every $24^{th}$ snapshot marked P2 (i.e., L3/L2=86400/3600=24) will be marked as P3 to be retained at the target side for 24 hours (i.e., L3=86400 seconds). It should be understood that the marking of the snapshots is transferred from the source site to the target site so the replica manager 150 may manage the retention of the replicas 160 according to the policy 165.

Figure 5:
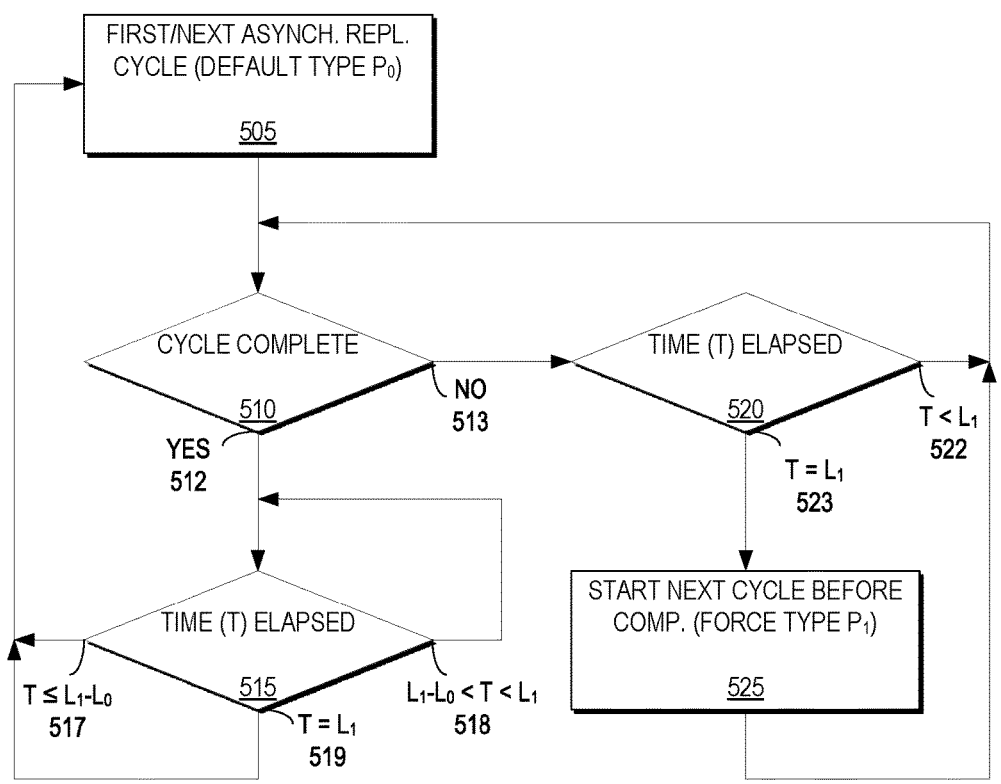
FIG. 5 is a flow diagram illustrating a method for determining a time of a next asynchronous replication cycle switch according to an example embodiment of the present invention.

FIG. 5 is a flow diagram illustrating a method for determining a time of a next asynchronous replication cycle switch according to an example embodiment of the present invention. In certain embodiments, host writes may exceed the average link bandwidth between the source site 110 and the target site 120 and, in this case, an asynchronous replication cycle may not be able to finish within $L_0$ seconds. For example, using $L_0=5$ seconds in our example, it may take 20 seconds, a minute, an hour, or more. Accordingly, when a cycle exceeds its minimal cycle time $L_0$, according to example embodiments of the present invention, the system 100 uses the following method to determine the time of the next cycle switch.

FIG. 5 may be described in conjunction with FIG. 3. In a preferred embodiment, the method described below is performed in conjunction with marking the cycles as $P_1$, $P_2$, $P_3$, . . . as described above with respect to FIG. 4.

The system 100 may perform a first asynchronous replication cycle of type $P_0$ (505) and determine whether cycle transmission is complete (510).

If cycle transmission is complete (512), the system 100 determines how much time elapsed in completing the asynchronous replication cycle (515).

If the amount of elapsed time for the completed asynchronous replication cycle is up to and including $L_1-L_0$ (i.e., $T<L_1-L_0$) (517), the system 100 may continue with the next asynchronous replication cycle of type $P_0$ (505). For example, as illustrated in FIG. 3, transmission of asynchronous replication cycle $C[P_0]=1$ completed before $L_1-L_0$ (i.e., 55 secs.) and the system 100 may continue with the next asynchronous replication cycle of type $P_0$, $C[P_0]=2$ upon completion of asynchronous replication cycle $C[P_0]=1$.

If the amount of elapsed time for the completed asynchronous replication cycle is after $L_1-L_0$ (i.e., 55 secs.) but before $L_1$ (i.e., 60 secs.) (i.e., $L1-L0<T<L1$) (518), the system 100 may wait until $L_1$ seconds pass (e.g., in order to align cycle times with $L_1$). For example, as illustrated in FIG. 3, transmission of asynchronous replication cycle $C[P_0]=2$ completed after $L_1-L_0$ (i.e., 55 secs.) but before $L_1$ (i.e., 60 secs.) and the system 100 waits until the amount of elapsed time is $L_1$ (i.e., 60 secs.) (i.e., $T=L_1$) (519) before continuing with the next asynchronous replication cycle of type $P_0$, $C[P_0]=3$ (not shown). In other words, in example embodiments of the present invention there are no partial cycles spanning $L_1$.

If asynchronous replication cycle transmission is not complete (513), the system 100 determines how much time has elapsed in the asynchronous replication cycle (520). If the amount of elapsed time for the asynchronous replication cycle is before $L_1$ (i.e., 60 secs.) (i.e., $T<L_1$) (522), the system 100 allows the asynchronous replication cycle to continue to resume monitoring whether the cycle is complete (510).

However, if asynchronous replication cycle transmission is not complete and the amount of elapsed time for the asynchronous replication cycle is $L_1$ (i.e., 60 secs.) (i.e., $T=L_1$) (523), the system 100 forces creation of a new asynchronous replication cycle at the source site 110 and marks it of type $P_1$ (525). It should be noted that transmission of the existing asynchronous replication cycle continues. For example, as illustrated in FIG. 3, transmission of asynchronous replication cycle $C[P_0]=6$ is not complete at $L_1$ (i.e., 60 secs.), the system 100 forces the source site 110 to create a new asynchronous replication cycle of type $P_1$ $C[P_1]=2$ (note $C[P_1]=1$ was created previously in the $L_1/L_0$ cycle), and the existing asynchronous replication cycle $C[P_0]=6$ continues until it completes some time after $L_1$.

It should be noted that, in certain embodiments, because forcing the start of new asynchronous replication cycles may happen multiple times, the number of cycles at the source site 110 can grow to any number the system 100 can support (e.g., according to its resources). Further, the system may adjust the frequency at which new asynchronous replication cycles are started if transmission of the cycles is not able to complete before the start of the next cycle or cap the number of allowed cycles on the source site 110. However, it is important to note that, certain embodiments of the present invention address temporary resource shortages that may resolve themselves and allow the asynchronous replication system to catch up transmission of a backlog of asynchronous replication cycles.

Figure 6:
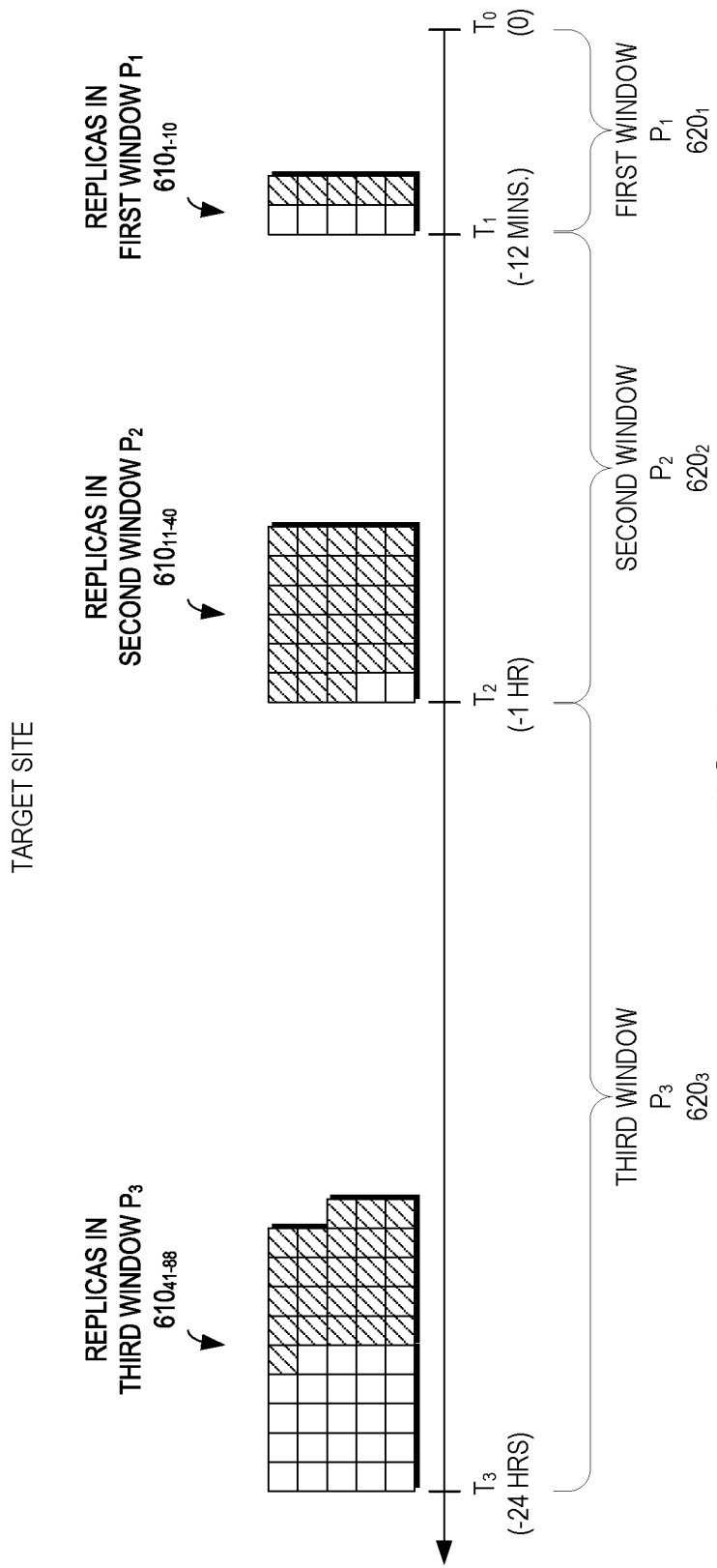
FIG. 6 is a block diagram of time having a plurality of retention windows each having respective pluralities of replicas according to an example embodiment of the present invention.

FIG. 6 is a block diagram of time having a plurality of retention windows $P_1$ 620$_1$, $P_2$ 620$_2$, and $P_3$ 620$_3$ (620 generally), with $P_1$ covering the range $T_0=0$ secs. to $T_1=-12$ mins. (i.e., $L_1/L_0$), $P_2$ covering the range $T_1$ to $T_2=-1$ hour (i.e., $L_2/L_1$), and $P_3$ covering the range $T_2$ to $T_3=-24$ hours (i.e., $L_3/L_2$). Each retention window 620 has a respective pluralities plurality of replicas 610$_{1-10}$, 610$_{11-40}$, 610$_{41-88}$ (610 generally) according to an example embodiment of the present invention. The replicas 610 (e.g., replicas 160 of FIG. 1) are at a target site 120 and a replica manager 150 may execute a retention policy 165 to determine respective replicas 160 from the retention windows 620 to retain for periods of time.

As illustrated in FIG. 6, there are 10 replicas 610$_{1-10}$ in the first window $P_1$ 620$_1$, 30 replicas 610$_{11-40}$ in the second window $P_2$ 620$_2$, and 48 replicas 610$_{41-88}$ in the third window $P_3$ 620$_3$. However, in this example embodiment, the retention policy 165 defines that the first window $P_1$ 620$_1$ should retain 5 replicas in the past 12 minutes, the second window $P_2$ 620$_2$ should retain 2 replicas in the past hour (excluding those replicas in all previous windows (i.e., $P_1$ 620$_1$), and the third window $P_3$ 620$_3$ should retain 24 replicas in the past 24 hours (excluding those replicas in all previous windows (i.e., $P_1$620$_1$ and $P_2$ 620$_2$), with the number of extraneous replicas in each window 620 represented by the hashes. As will be described in greater detail below, new snapshots are received at the target site 120 at unpredictable times and example embodiments of the present invention may decide which snapshots to keep and which snapshots to eliminate (e.g., based on the time they were created, the amount of data they protect, or the amount of changes they contain). In other embodiments, the time windows may overlap such that replicas in the previous windows are included.

Figure 7A:
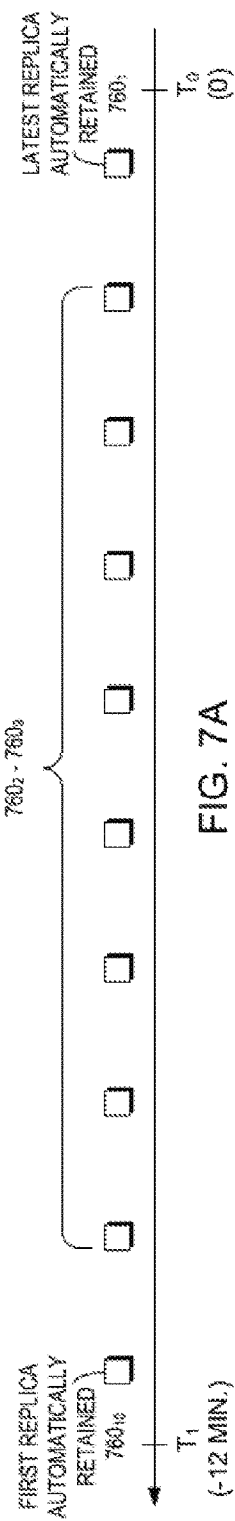
FIGS. 7A-7C are block diagrams of computing a score indicative of an importance of each replica in a range of replicas of the plurality of replicas for each respective retention windows of FIG. 6 according to an example embodiment of the present invention.
Figure 7B:
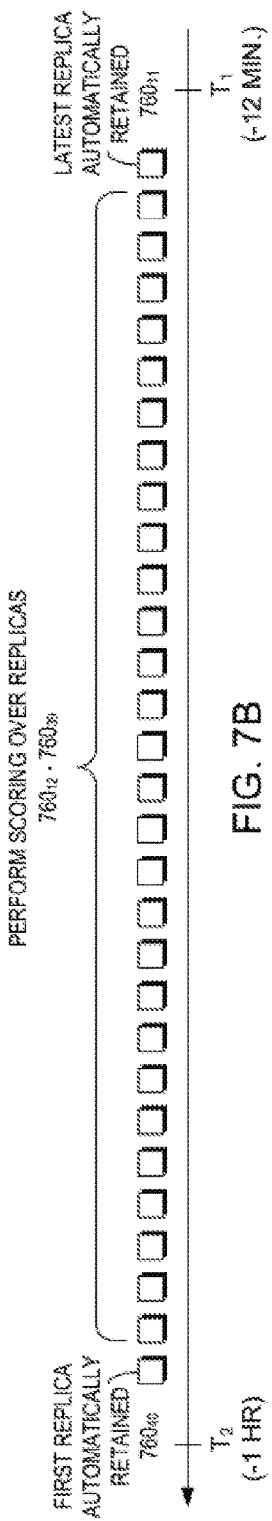
Figure 7C:
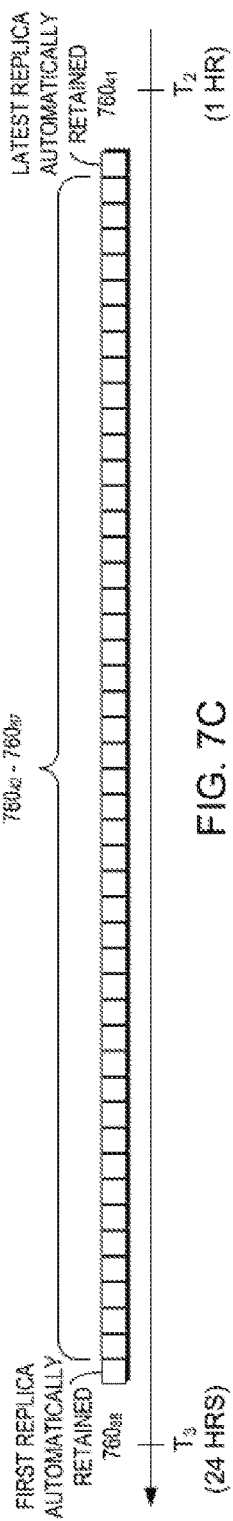

FIGS. 7A-7C are block diagrams of computing a score indicative of an importance of each replica in a range of replicas of the plurality of replicas for each respective retention window of FIG. 6 according to an example embodiment of the present invention. FIGS. 7A-7C may be described in conjunction with FIG. 8, which is a flow diagram illustrating a method for determining replicas for removal from a plurality of replicas according to an example embodiment of the present invention. As illustrated in FIGS. 7A-7C and 8, the replica manager 160 may identify a set of user conditions associated with the first window $P_1$ as defined in the data retention policy 165 (805). For example, the replica manager 160 may determine from the data retention policy 165 that the first window $P_1$ should retain 5 replicas in the past 12 minutes, the second window $P_2$ should retain 2 replicas in the past hour, and the third window $P_3$ should retain 24 replicas in the past 24 hours.

Figure 8:
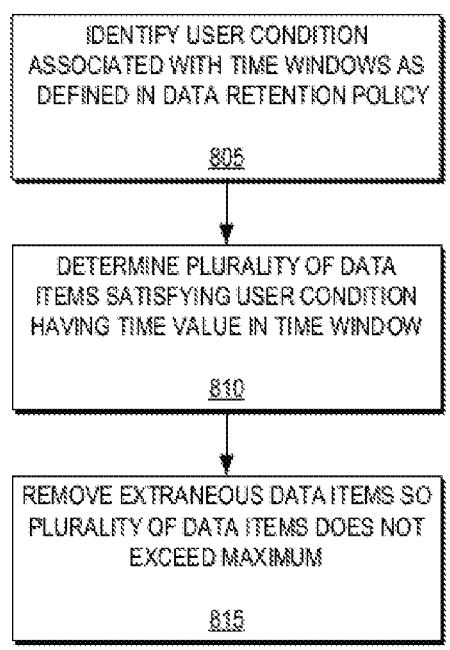
FIG. 8 is a flow diagram illustrating a method for determining replicas for removal from a plurality of replicas according to an example embodiment of the present invention.

As illustrated in FIGS. 7A and 8, for the first window (e.g., first window $P_1$ $620_1$ of FIG. 6), the replica manager 160 may determine a plurality of replicas satisfying the user condition (i.e., window) having a time value in the associated time window (810). In other words, the replica manager 160 may determine there are 10 replicas $760_{1-10}$ in the first window $P_1$. Similarly, for FIGS. 7B, 7C, and 8, the replica manager 160 may determine there are 30 replicas $760_{11}$-$760_{40}$ and 48 replicas $760_{41}$-$760_{88}$ in the second and third windows, respectively (810). The replica manager 160 then may determine whether the plurality of replicas exceeds a maximum for each window as defined in the data retention policy (i.e., 5 in the first window $P_1$, 2 in the second window $P_2$, and 24 in the third window $P_3$) and, if so, remove extraneous replicas from the plurality of replicas so the plurality of replicas does not exceed the maximum for the window (815).

Figure 9:
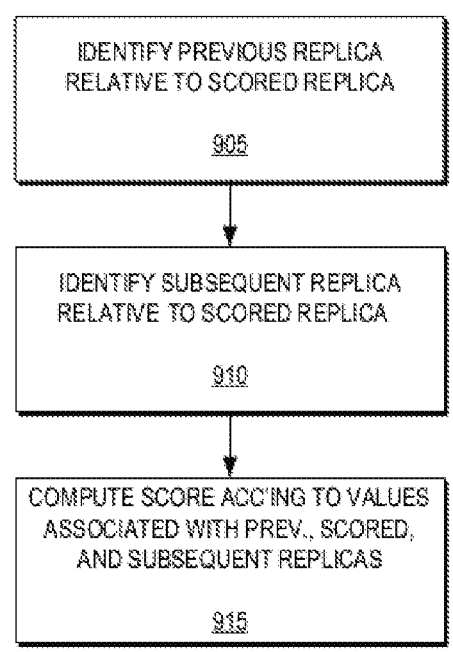
FIG. 9 is a flow diagram illustrating a method for computing a score of each replica in a range of replicas of the plurality of replicas according to an example embodiment of the present invention.

FIG. 9 is a flow diagram illustrating a method for computing a score of each replica in a range of replicas of the plurality of replicas according to an example embodiment of the present invention. As illustrated in FIG. 9, in order to determine which replicas of the plurality of replicas should be retained and which replicas should be removed in order to comply with the retention policy, the replica manager 160 generates a score for each replica. As will be described in greater detail below with respect to FIG. 10, the replica manager 160 identifies a previous replica relative to the replica being scored (905) and identifies a subsequent replica relative to the replica being scored (910). The replica manager 160 then, as will be described in greater detail below with respect to FIG. 10, may compute the score according to values associated with the previous, scored, and subsequent replicas (915).

Figure 10:
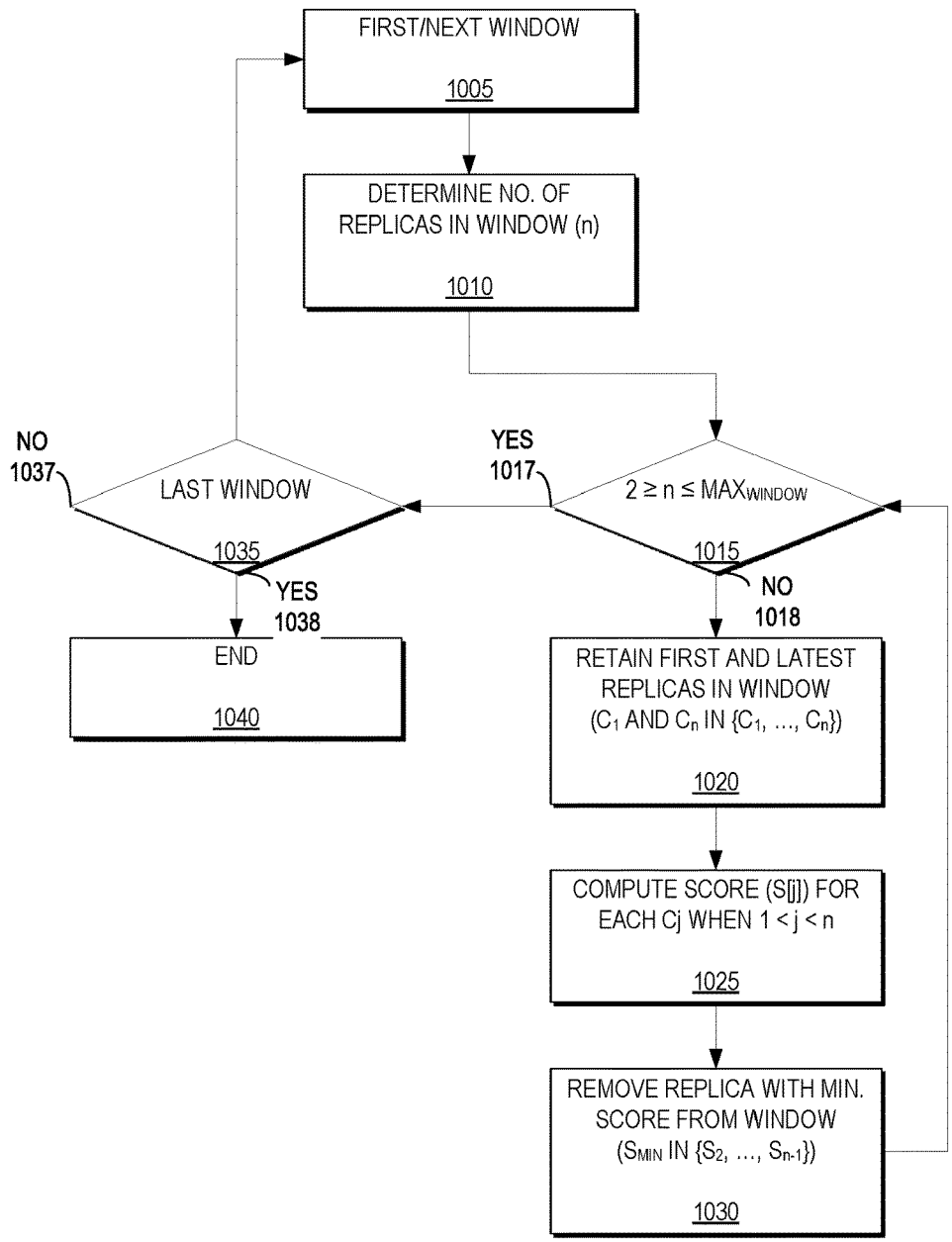
FIG. 10 is a flow diagram illustrating a method for scoring and removing the replica with the minimum score from the window for each retention window according to an example embodiment of the present invention.

FIG. 10 is a flow diagram illustrating a method for scoring and removing the replica with the minimum score from the window for each retention window according to an example embodiment of the present invention. FIG. 10 may be described with reference to FIGS. 7A-7C. The replica manager 160 may examine the first window $P_1$ (1005) and count the number of replicas in the window $P_1$ (ignoring any copies that belong to the previous window, if any) (1010). Thus, the replica manager 160 may determine that there are 10 replicas in the first window $P_1$ of FIG. 7A and determine whether the number of replicas n is at least 2 but within the user policy maximum M for the first window $P_1$ (i.e., is 2≥n≤M?) (1015).

If the number of copies n is within the user policy (1017) the replica manager may proceed to the next retention window $P_2$ (1005). However, if the number of copies n exceeds the user policy maximum for the window M (i.e., n>M) (1018) the replica manager 160 may automatically retain the first and latest replicas in the retention window $P_1$ (i.e., replicas $C_1$ and $C_n$ in the set of replicas $\{C_1, \ldots, C_n\}$) (e.g., latest replica $760_1$ and first replica $760_{10}$ of FIG. 7A) (1020).

The replica manager 160 then may compute a score S[j] for each of the remaining replicas in the retention window $P_1$ (i.e., replicas Cj when 1<j<n) (e.g., replicas $760_2$-$760_9$ of FIG. 7A) (1025). Example methods for computing the score will be described below with reference to FIG. 11. The replica with the minimum score (i.e., SMIN in the set of scores $\{S_2, \ldots, S_{n-1}\}$) then may be removed from the retention window $P_1$ (1030). The method then return returns to recursively determine whether the number of replicas satisfies the policy (1015) until it does (1017).

The replica manager 160 may determine whether it has examined the last retention window (1035) and, if it has not (1037), it will transition to the next (e.g., second) retention window (1005) and determine the number of replicas in the second retention window $P_2$ (1010). Thus, the replica manager 160 may determine that there are 30 replicas in the second window $P_2$ of FIG. 7B and determine whether the number of replicas n is at least 2 but within the user policy maximum M for the first window $P_2$ (i.e., is 2≥n≤M?) (1015).

If the number of copies n is within the user policy (1017) the replica manager may proceed to the next retention window $P_3$ (1005). However, if the number of copies n exceeds the user policy maximum for the window M (i.e., n>M) (1018) the replica manager 160 may automatically retain the first and latest replicas in the retention window $P_2$ (i.e., replicas $C_1$ and $C_n$ in the set of replicas $\{C_1, \ldots, C_n\}$) (e.g., latest replica $760_{11}$ and first replica $760_{40}$ of FIG. 7B) (1020).

The replica manager 160 then may compute a score S[j] for each of the remaining replicas in the retention window $P_2$ (i.e., replicas Cj when 1<j<n) (e.g., replicas $760_{12}$-$760_{39}$ of FIG. 7B) (1025). Example methods for computing the score will be described below with reference to FIG. 11. The replica with the minimum score (i.e., SMIN in the set of scores $\{S_2, \ldots, S_{n-1}\}$) then may be removed from the retention window $P_2$ (1030). The method then returns to recursively determine whether the number of replicas satisfies the policy (1015) until it does (1017).

The replica manager 160 may determine whether it has examined the last retention window (1035) and, if it has not (1037), it will transition to the next (e.g., third) retention window (1005) and determine the number of replicas in the second retention window $P_3$ (1010). Thus, the replica manager 160 may determine that there are 48 replicas in the third window $P_3$ of FIG. 7C and determine whether the number of replicas n is at least 2 but within the user policy maximum M for the first window $P_2$ (i.e., is 2≥n≤M?) (1015).

If the number of copies n is within the user policy (1017) the replica manager may attempt to proceed to the next retention window, but the replica manager will determine whether $P_3$ is the last window (1035) (which it is (1038)) and end (1040). However, if the number of copies n exceeds the user policy maximum for the window M (i.e., n>M) (1018) the replica manager 160 may automatically retain the first and latest replicas in the retention window $P_3$ (i.e., replicas $C_1$ and $C_n$ in the set of replicas $\{C_1, \ldots, C_n\}$) (e.g., latest replica $760_{41}$ and first replica $760_{88}$ of FIG. 7C) (1020).

The replica manager 160 then may compute a score S[j] for each of the remaining replicas in the retention window $P_3$ (i.e., replicas Cj when $1 < j < n$) (e.g., replicas $760_{42}$-$760_{87}$ of FIG. 7C) (1025). Example methods for computing the score will be described below with reference to FIG. 11. The replica with the minimum score (i.e., SMIN in the set of scores $\{S_2, \ldots, S_{n-1}\}$) then may be removed from the retention window $P_3$ (1030). The method then returns to recursively determine whether the number of replicas satisfies the policy (1015) until it does (1017), at which point the replica manager will determine whether $P_3$ is the last window (1035) (which it is (1038)) and end (1040).

Figure 11:
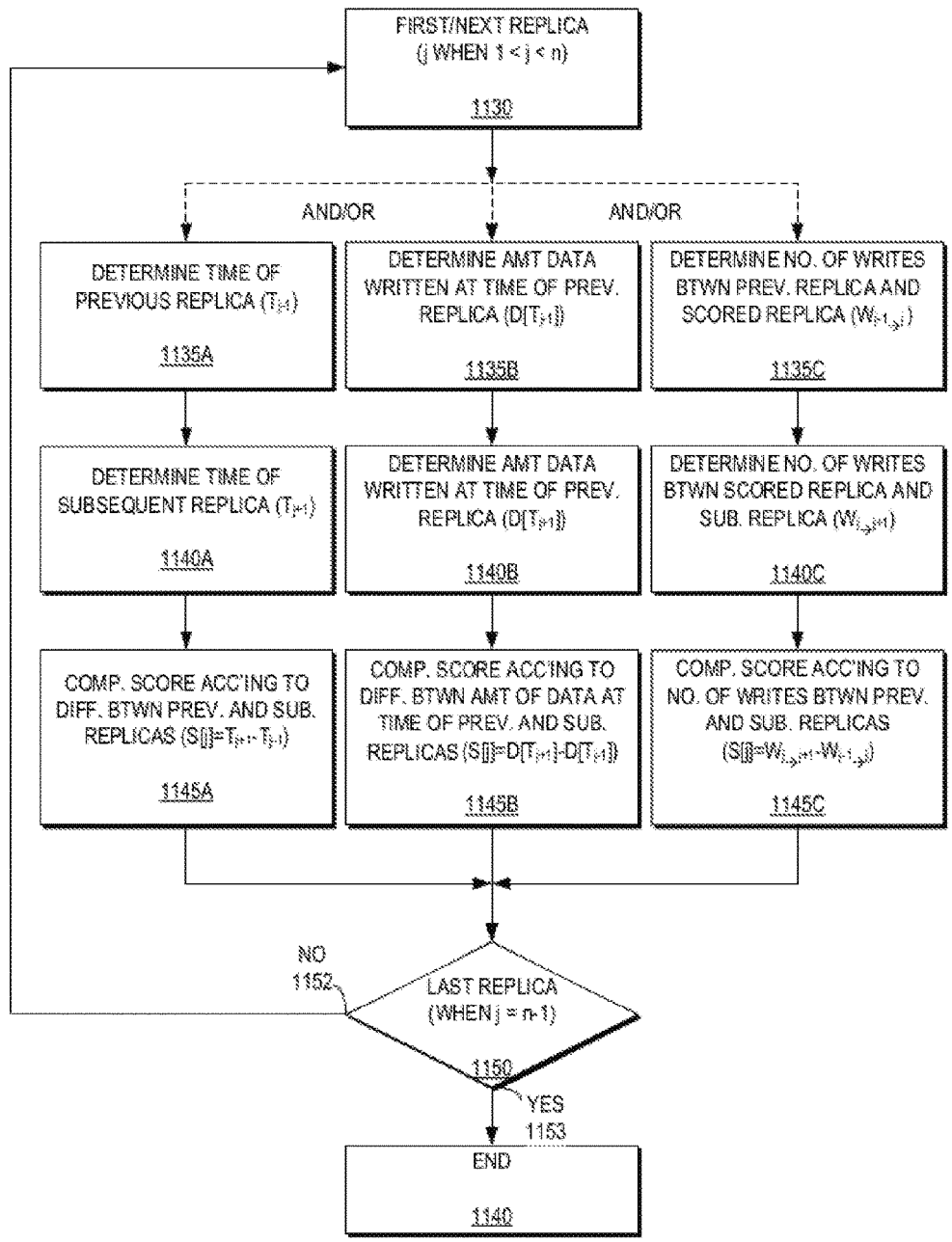
FIG. 11 is a flow diagram illustrating a plurality of methods for scoring replicas that may be employed individually or in combination according to an example embodiment of the present invention.

FIG. 11 is a flow diagram illustrating a plurality of methods for scoring replicas that may be employed individually or in combination according to an example embodiment of the present invention. As illustrated in FIG. 11, the replica manager 160 may compute the score S[j] for each of the remaining replicas in the retention windows (i.e., replicas Cj when $1 < j <$ (e.g., replicas $760_2$-$760_9$ of FIG. 7A for the first retention window $P_1$, replicas $760_{12}$-$760_{39}$ of FIG. 7B for the second retention window $P_2$, and replicas $760_{42}$-$760_{87}$ of FIG. 7C for the third retention window $P_3$) (1130). As described above with respect to FIG. 9, in example embodiments, the score for a replica is calculated according to values associated with the previous, scored, and subsequent replicas. The replica manager then may determine if it has scored the last replica (i.e., when $j=n-1$) (1150). If replicas still remain in the retention window being scored (i.e., $j < n-1$) (1152) the replica manager then may score the next replica (1130). However, if the replica manager has scored the last replica (i.e., $j=n-1$) (1153) then the scoring method ends (1140).

A first example embodiment scoring method may be based on time. The replica manager 160 may determine the time of the previous replica (i.e., $T_{j-1}$) (1135A) and determine the time of the subsequent replica (i.e., $T_{j+1}$) (1140A). The replica manager 160 then may compute the score according to the difference between the times of the previous replica and the subsequent replica (i.e., $S[j]=T_{j+1}-T_{j-1}$) (1145A). It should be understood that the bigger the gap, the more important j is. Further, the resulting replicas are distributed as evenly as possible in time. For example, for a user which asks for 24 replicas in the last 24 hours, example embodiments of the present invention will converge (under normal conditions) to a replica every hour.

A second example embodiment scoring method may be based on the amount of data changed. The replica manager 160 may determine the amount of data written at the time of the previous replica (i.e., $D[T_{j-1}]$) (1135B) and determine the amount of data written at the time of the subsequent replica (i.e., $D[T_{k+1}]$) (1140B). The replica manager 160 then may compute the score according to the difference between the amount of data at the time of the previous replica and the subsequent replica (i.e., $S[j]=D[T_{j+1}]-D[T_{j-1}]$) (1145B). It should be understood that replicas representing the greatest amount of data have a higher score. Further, the resulting replicas converge to an even amount of changes (e.g., in bytes) between replicas.

A third example embodiment scoring method may be based on the number of writes. The replica manager 160 may determine the number of writes between the previous replica and the scored replica (i.e., $W_{j-1 \to j}$) (1135C) and determine the number of writes between the scored replica and the subsequent replica (i.e., $W_{j \to j+1}$) (1140C). The replica manager 160 then may compute the score according to the number of writes between the previous replica and the subsequent replica (i.e., $S[j]=W_{j \to j+1}-W_{j-1 \to j}$) (1145C). It should be understood that the number of writes represented by each replica gives that replica a higher value. Further, the resulting replicas converge to an even number of writes (e.g., in I/Os) between replicas.

It should be understood that each of the three methods of scoring replicas may be used individually or in combination. Additional methods may be constructed to weigh a combination of the above factors (e.g., time difference, byte difference, and I/O difference) to calculate any user-defined score S[j] for a copy Cj. For example, the score can be the sum of normalized values of the scores discussed above.

Figure 12:
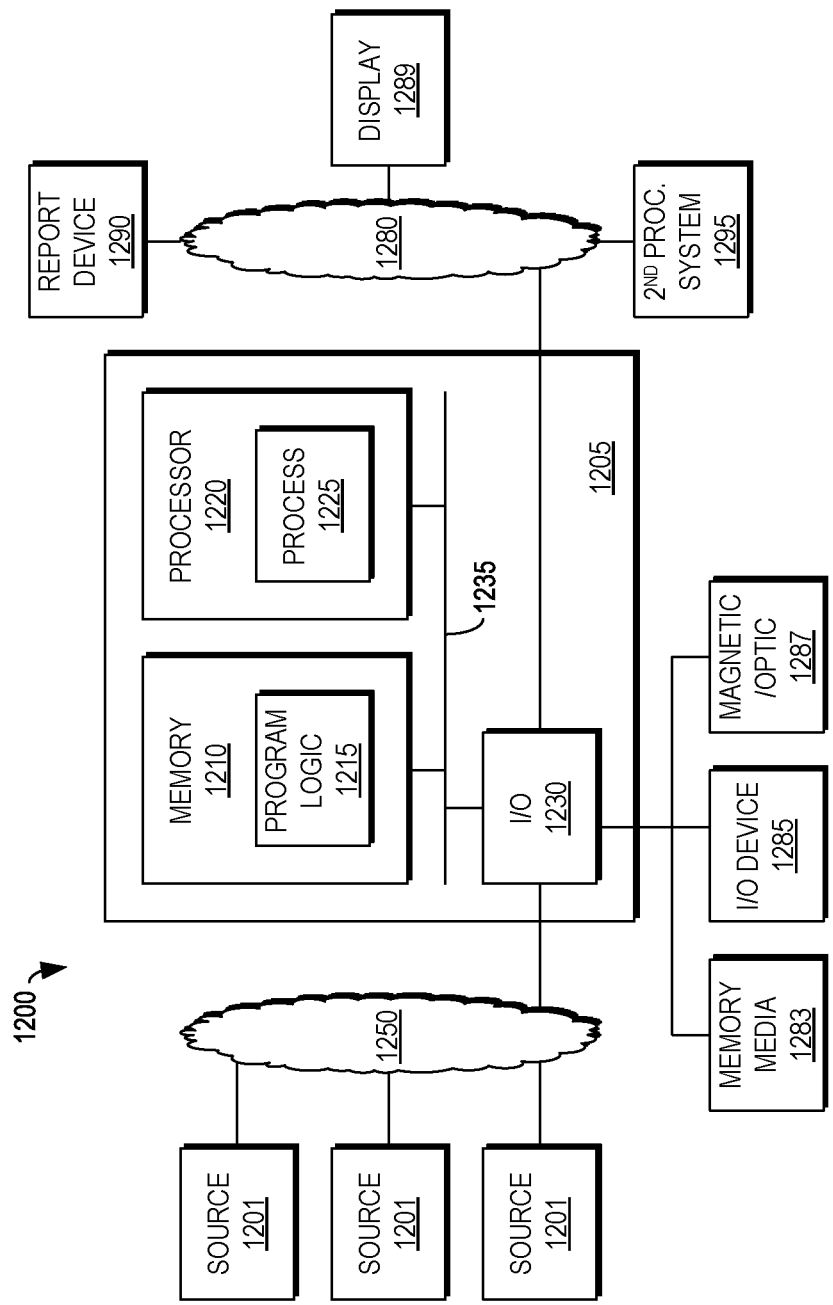
FIG. 12 is a block diagram of an apparatus according to an example embodiment of the present invention.

FIG. 12 is a block diagram of an example embodiment apparatus 1205 according to the present invention. The apparatus 1205 may be part of a system 1200 and includes memory 1210 storing program logic 1215, a processor 1220 for executing a process 1225, and a communications I/O interface 1230, connected via a bus 1235. The apparatus 1250 is configured to communicate with memory media 1283, I/O devices 1285, and magnetic or optical (magnetic/optic) drives 1287 via the communications I/O interface 1230. The apparatus 1250 is configured to communicate with a plurality of sources 1201 via a network 1250 using communications I/O interface 1230. The apparatus 1250 is further configured to communicate with a display 1289, a report device 1290, and a second processing system 1295 via a network 1280 using communications I/O interface 1230.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 12, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 13:
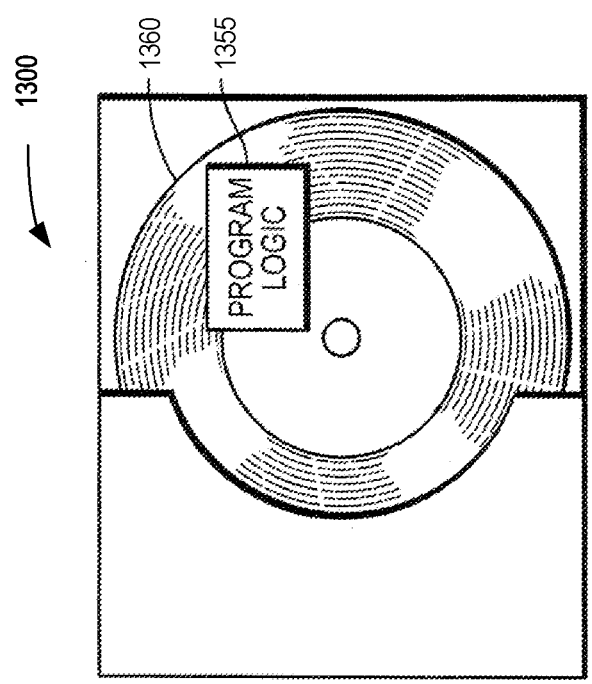
FIG. 13 is a block diagram of a computer program product including an example embodiment of the present invention as embodied in computer program code.

FIG. 13 is a block diagram of a computer program product 1300 including program logic 1355, encoded on a computer-readable medium 1360 in computer-executable code configured for carrying out the methods of the invention, according to an example embodiment of the present invention. The logic for carrying out the method may be embodied as part of the aforementioned system, which is useful for carrying out a method described with reference to embodiments shown.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A method comprising:
identifying a set of user conditions, each user condition being associated with a time window in a plurality of time windows as defined in a data retention policy, each user condition defining a maximum number of replicas for the associated time window; and
for each user condition:
identifying a plurality of replicas each of which has a time value in the associated time window;
computing a score indicative of an importance of each replica in the plurality of replicas, the computing for a given replica in the plurality of replicas comprising:
identifying a previous replica relative to the given replica;
identifying a subsequent replica relative to the given replica; and
computing the score for the given replica according to values associated with the previous replica, the given replica, and the subsequent replica; and
based at least in part on a determination that the plurality of replicas comprise a number of replicas greater than the maximum number of replicas for the associated time window as defined by the user condition, removing extraneous replicas from the plurality of replicas based at least in part on the scores so that the plurality of replicas comprise a number of replicas equal to or less than the maximum number of replicas for the associated time window as defined by the user condition.

2. The method of claim 1 wherein the plurality of replicas excludes a replica having an earliest time value in the associated time window and a replica having a latest time value in the associated time window.

3. The method of claim 1 wherein computing the score of the given replica according to values associated with the previous replica, the given replica, and the subsequent replica comprises computing the score of the given replica according to one or more of an amount of time elapsed, an amount of data written during the amount of time elapsed, and a number of operations performed during the amount of time elapsed.

4. The method of claim 3 wherein computing the score of the given replica according to an amount of time elapsed comprises:
determining a first time value of the previous replica relative to the given replica;
determining a second time value of the subsequent replica relative to the given replica; and
calculating the score of the given replica according to the difference between the first time value of the subsequent replica and the second time value of the previous replica.

5. The method of claim 3 wherein computing the score of the given replica according to an amount of data written during the amount of time elapsed comprises:
determining a first time value of the previous replica relative to the given replica;
determining a second time value of the subsequent replica relative to the given replica;
tracking the amount of data written between the first time value of the previous replica and the second time value of the subsequent replica; and
calculating the score of the given replica according to the amount of data written between the first time value of the previous replica and the second time value of the subsequent replica.

6. The method of claim 3 wherein computing the score of the given replica according to a number of operations performed during the amount of time elapsed comprises:
determining a first time value of the previous replica relative to the given replica;
determining a second time value of the subsequent replica relative to the given replica;
tracking the number of operations performed between the first time value of the previous replica and the second time value of the subsequent replica; and
calculating the score of the given replica according to the number of operations performed between the first time value of the previous replica and the second time value of the subsequent replica.

7. The method of claim 1 wherein the plurality of replicas are snapshots generated by an asynchronous replication engine.

8. A system comprising:
a processor; and
memory storing computer program code that when executed on the processor causes the processor to execute a data retention process operable to perform the operations of:
identifying a set of user conditions, each user condition being associated with a time window in a plurality of time windows as defined in a data retention policy, each user condition defining a maximum number of replicas for the associated time window; and
for each user condition:
identifying a plurality of replicas each of which has a time value in the associated time window; and
computing a score indicative of an importance of each replica in the plurality of replicas, the computing for a given replica in the plurality of replicas comprising:
identifying a previous replica relative to the given replica;
identifying a subsequent replica relative to the given replica; and
computing the score for the given replica according to values associated with the previous replica, the given replica, and the subsequent replica; and
based at least in part on a determination that the plurality of replicas comprise a number of replicas greater than the maximum number of replicas for the associated time window as defined by the user condition, removing extraneous replicas from the plurality of replicas based at least in part on the scores so that the plurality of replicas comprise a number of replicas equal to or less than the maximum number of replicas for the associated time window as defined by the user condition.

9. The system of claim 8 wherein the plurality of replicas excludes a replica having an earliest time value in the associated time window and a replica having a latest time value in the associated time window.

10. The system of claim 8 wherein computing the score of the given replica according to values associated with the previous replica, the given replica, and the subsequent replica comprises computing the score of the given replica according to one or more of an amount of time elapsed, an amount of data written during the amount of time elapsed, and a number of operations performed during the amount of time elapsed.

11. The system of claim 10 wherein computing the score of the given replica according to an amount of time elapsed comprises:
   determining a first time value of the previous replica relative to the given replica;
   determining a second time value of the subsequent replica relative to the given replica; and
   calculating the score of the given replica according to the difference between the first time value of the subsequent replica and the second time value of the previous replica.

12. The system of claim 10 wherein computing the score of the given replica according to an amount of data written during the amount of time elapsed comprises:
   determining a first time value of the previous replica relative to the given replica;
   determining a second time value of the subsequent replica relative to the given replica;
   tracking the amount of data written between the first time value of the previous replica and the second time value of the subsequent replica; and
   calculating the score of the given replica according to the amount of data written between the first time value of the previous replica and the second time value of the subsequent replica.

13. The system of claim 10 wherein computing the score of the given replica according to a number of operations performed during the amount of time elapsed comprises:
   determining a first time value of the previous replica relative to the given replica;
   determining a second time value of the subsequent replica relative to the given replica;
   tracking the number of operations performed between the first time value of the previous replica and the second time value of the subsequent replica; and
   calculating the score of the given replica according to the number of operations performed between the first time value of the previous replica and the second time value of the subsequent replica.

14. The system of claim 8 wherein the plurality of replicas are snapshots generated by an asynchronous replication engine.

15. A computer program product including a non-transitory computer readable storage medium having computer program code encoded thereon that when executed on a processor of a computer causes the computer to execute a data retention process comprising:
   identifying a set of user conditions, each user condition being associated with a time window in a plurality of time windows as defined in a data retention policy, each user condition defining a maximum number of replicas for the associated time window; and
   for each user condition:
      identifying a plurality of replicas each of which has a time value in the associated time window;
      computing a score indicative of an importance of each replica in the plurality of replicas, the computing for a given replica in the plurality of replicas comprising:
         identifying a previous replica relative to the given replica;
         identifying a subsequent replica relative to the given replica; and
         computing the score for the given replica according to values associated with the previous replica, the given replica, and the subsequent replica; and
      based at least in part on a determination that the plurality of replicas comprise a number of replicas greater than the maximum number of replicas for the associated time window as defined by the user condition, removing extraneous replicas from the plurality of replicas based at least in part on the scores so that the plurality of replicas comprise a number of replicas equal to or less than the maximum number of replicas for the associated time window as defined by the user condition.

16. The computer program product of claim 15 wherein the plurality of replicas excludes a replica having an earliest time value in the associated time window and a replica having a latest time value in the associated time window.

17. The computer program product of claim 15 wherein computing the score of the given replica according to values associated with the previous replica, the given replica, and the subsequent replica comprises computing the score of the given replica according to one or more of an amount of time elapsed, an amount of data written during the amount of time elapsed, and a number of operations performed during the amount of time elapsed.

18. The computer program product of claim 17 wherein computing the score of the given replica according to an amount of time elapsed comprises:
   determining a first time value of the previous replica relative to the given replica;
   determining a second time value of the subsequent replica relative to the given replica; and
   calculating the score of the given replica according to the difference between the first time value of the subsequent replica and the second time value of the previous replica.

19. The computer program product of claim 17 wherein computing the score of the given replica according to an amount of data written during the amount of time elapsed comprises:
   determining a first time value of the previous replica relative to the given replica;
   determining a second time value of the subsequent replica relative to the given replica;
   tracking the amount of data written between the first time value of the previous replica and the second time value of the subsequent replica; and
   calculating the score of the given replica according to the amount of data written between the first time value of the previous replica and the second time value of the subsequent replica.

20. The computer program product of claim 17 wherein computing the score of the given replica according to a number of operations performed during the amount of time elapsed comprises:
   determining a first time value of the previous replica relative to the given replica;
   determining a second time value of the subsequent replica relative to the given replica;

tracking the number of operations performed between the first time value of the previous replica and the second time value of the subsequent replica; and calculating the score of the given replica according to the number of operations performed between the first time value of the previous replica and the second time value of the subsequent replica.

21. The computer program product of claim 15 wherein the plurality of replicas are snapshots generated by an asynchronous replication engine.

* * * * *